United States Patent
Lim et al.

(10) Patent No.: US 10,545,637 B2
(45) Date of Patent: Jan. 28, 2020

(54) METHOD AND APPARATUS FOR PROVIDING IDLE SCREEN SERVICE

(71) Applicant: KT Corporation, Seongnam (KR)

(72) Inventors: Sang-hyun Lim, Seoul (KR); Gwi-Ho Chun, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 449 days.

(21) Appl. No.: 14/171,441

(22) Filed: Feb. 3, 2014

(65) Prior Publication Data

US 2014/0149879 A1 May 29, 2014

Related U.S. Application Data

(63) Continuation of application No. 13/861,968, filed on Apr. 12, 2013, now Pat. No. 8,688,091, which is a (Continued)

(30) Foreign Application Priority Data

Mar. 10, 2006 (KR) .................. 10-2006-0022696

(51) Int. Cl.
*G06F 3/0484* (2013.01)
*H04W 4/18* (2009.01)

(52) U.S. Cl.
CPC ............ *G06F 3/0484* (2013.01); *H04W 4/18* (2013.01)

(58) Field of Classification Search
CPC ......................................... G06F 3/048–04897
See application file for complete search history.

(56) References Cited

U.S. PATENT DOCUMENTS 6,278,448 B1 * 8/2001 Brown .................. G06F 3/0481
715/866
6,493,758 B1 12/2002 McLain
(Continued)

FOREIGN PATENT DOCUMENTS

EP 0982656 A1 3/2000
EP 01098457 A1 5/2001
(Continued)

OTHER PUBLICATIONS

European Search Report, dated Jan. 5, 2011.
(Continued)

*Primary Examiner* — Jennifer N To
*Assistant Examiner* — Liang Y Li
(74) *Attorney, Agent, or Firm* — Sughrue Mion, PLLC

(57) ABSTRACT

A method and apparatus for providing an idle screen service are disclosed. A mobile communication terminal receiving contents provided from at least one content provider server in a mobile communication system environment is also disclosed. The mobile communication terminal may include a content receiver module which receives contents provided through a mobile communication system by separating into layers, a handset operating system module which operates the terminal and runs an application and which has a user interface, and a content management application mod ole which synthesizes the contents separated into layers received from the content receiver module into one idle screen layer and which provides it to the idle screen of the mobile communication terminal. According to at least one embodiment of the invention, several contents provided in a mobile communication system environment can be provided at once on a mobile communication terminal idle screen in an idle mode, to satisfy the demands of the user for DIY services and increase the content participation rate.

19 Claims, 16 Drawing Sheets

Related U.S. Application Data continuation of application No. 12/207,385, filed on Sep. 9, 2008, now Pat. No. 8,489,083, which is a continuation of application No. PCT/KR2007/001179, filed on Mar. 9, 2007.

(56) References Cited

U.S. PATENT DOCUMENTS

| | | | |
|---|---|---|---|
| 6,854,115 B1* | 2/2005 | Traversat | G06F 11/203 711/113 |
| 7,039,425 B1* | 5/2006 | Mazawa | H04W 48/04 340/1.1 |
| 7,412,223 B1 | 8/2008 | Yamamoto et al. | |
| 2002/0093516 A1* | 7/2002 | Brunner | G06T 15/40 345/629 |
| 2004/0107439 A1* | 6/2004 | Hassell | H04N 5/44591 725/44 |
| 2004/0220943 A1* | 11/2004 | Ross | G06F 3/0481 |
| 2005/0021935 A1 | 1/2005 | Schillings et al. | |
| 2005/0114796 A1* | 5/2005 | Bast | G06F 3/0338 715/856 |
| 2005/0138105 A1 | 6/2005 | Lee et al. | |
| 2006/0010394 A1 | 1/2006 | Chaudhri et al. | |
| 2006/0288306 A1* | 12/2006 | Mahajan | G06F 9/4445 715/804 |
| 2006/0290661 A1* | 12/2006 | Innanen | H04M 1/72544 345/156 |
| 2007/0101279 A1* | 5/2007 | Chaudhri | G06F 3/0481 715/762 |
| 2007/0136443 A1* | 6/2007 | Sah | G06F 17/30867 709/219 |
| 2010/0153583 A1 | 6/2010 | Harris et al. | |

FOREIGN PATENT DOCUMENTS

| | | |
|---|---|---|
| EP | 1489497 A2 | 12/2004 |
| JP | 2005-039525 | 2/2005 |
| KR | 10-2002-0046062 A | 6/2002 |
| KR | 10-2003-0095607 A | 12/2003 |
| WO | 2005-104572 A1 | 11/2005 |

OTHER PUBLICATIONS

Japanese Office Action, dated Dec. 7, 2010, issued in Japanese Patent Application No. 2009-500283.

Chinese Office Action, dated Nov. 30, 2010, issued in Chinese Patent Application No. 2007-80008565.2.

International Search Report for International Application No. PCT/KR2007/001179 dated Jun. 26, 2007 by Korean Intellectual Property Office.

* cited by examiner

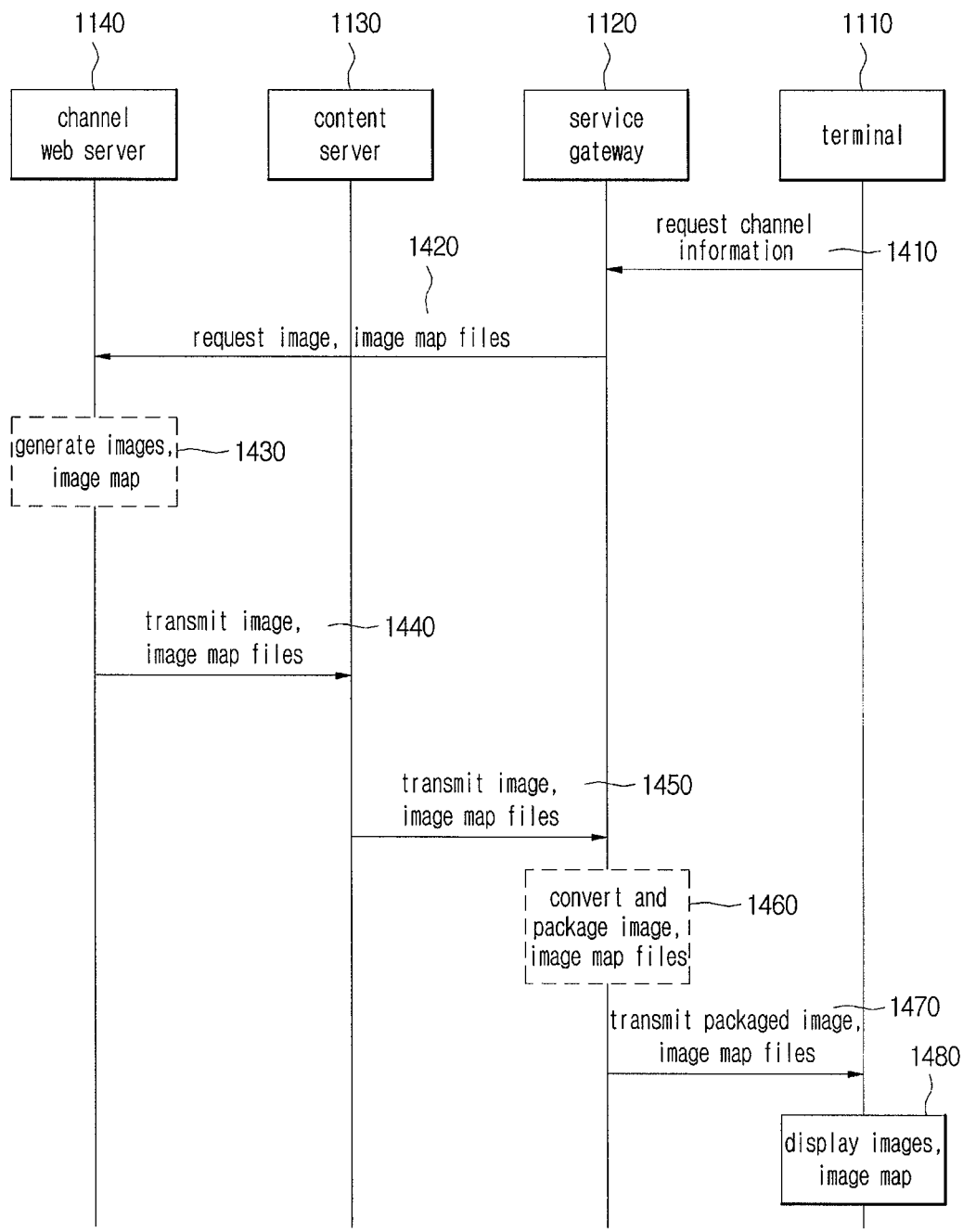

METHOD AND APPARATUS FOR PROVIDING IDLE SCREEN SERVICE

RELATED APPLICATIONS

This application is a continuation of U.S. patent application Ser. No. 13/861,968, which is a continuation of U.S. patent application Ser. No. 12/207,385, which is a continuation of PCT Application No. PCT/KR2007/001179, filed on Mar. 9, 2007, which claims priority from Korean Patent Application No. 10-2006-0022696, filed on Mar. 10, 2006, the disclosures of which are hereby incorporated herein in their entirety by reference.

BACKGROUND OF THE INVENTION

Field of the Invention

The invention relates to a method and apparatus for providing an idle screen (or desktop screen) service, more particularly to a method and apparatus for providing contents provided from a content provider server to a mobile communication terminal in an idle mode or providing a content-based dynamic background screen service.

Description of the Related Technology

The fields of electronic engineering and communication engineering have recently seen dramatic improvements. Further, the mobile communication terminal is also being equipped with various functions. That is, with fast-paced developments in wireless communication and data processing technology, people are able not only to use voice calls but also such functions as Internet access, visual communication and video message transmission, etc., on mobile communication terminals. Also, due to the rapid popularization of mobile communication terminals, the mobile communication terminal is becoming established as an essential means of communication in modern life, as a considerable amount of communication is being achieved via mobile communication terminals.

SUMMARY OF CERTAIN INVENTIVE ASPECTS

An aspect of the invention is a method and a mobile communication terminal that uses this method, for providing several contents on the idle screen of a mobile communication terminal in an idle mode.

Another aspect of the invention is a method and a mobile communication terminal that supports this method, that allow a user to change the contents provided on the idle screen of a mobile communication terminal at will without application changes.

Another aspect of the invention is a background screen service method and system that utilize contents to image the content matters such that they fit a standard, and provide them on the background screen in a dynamic manner.

Another aspect of the invention is a background screen service method and system which, when providing the background screen service, allow easy switching to another service through a channel type UI.

Another aspect of the invention is a background screen service method and system for updating the background screen of the terminal through a content packaging server or updating background images through the terminal client accessing a content packaging server having an image channel, when providing a content-based service.

Another aspect of the invention is a mobile communication terminal, for providing multiple contents on an idle screen, which includes a content receiver module which receives contents provided through a mobile communication system by separating into layers, a handset operating system module which operates the terminal and runs an application and which has a user interface, and a content management application module which synthesizes the contents separated into layers received from the content receiver module into one idle screen layer and which provides it to the idle screen of the mobile communication terminal.

Another aspect of the invention is a method of providing multiple contents provided from at least one content provider server in a mobile communication system environment on the idle screen of a mobile communication terminal, which includes (a) receiving contents provided to the mobile communication terminal through a mobile communication system and separating into layers, (b) synthesizing the contents received and separated into layers into one idle screen layer, and (c) providing the synthesized idle screen layer to the idle screen of the mobile communication terminal in an idle mode.

Another aspect of the invention is a recorded medium readable by a computer and having a program recorded for running a set of procedures for providing contents provided from at least one content provider server in a mobile communication system environment on the idle screen of a mobile communication terminal, where the set of procedures includes receiving contents provided to the mobile communication terminal through a mobile communication system and separating into layers, synthesizing the contents received and separated into layers into one idle screen layer, and providing the synthesized idle screen layer to the idle screen of the mobile communication terminal in an idle mode.

Another aspect of the invention is a method of providing a content-based, dynamic background screen service, which includes requesting information, when the user selects a desired channel, on the selected channel, imaging contents corresponding to the channel according to a preset standard and downloading the generated channel information, and changing/updating the background screen by setting the background screen as the downloaded channel information.

Here, the method of providing a content-based, dynamic background screen service may further include stopping the background screen changing/updating, when the user removes the selected channel from the background screen, and running a background screen deactivation, and switching to another service through a user interface (UI).

Another aspect of the invention is a content-based dynamic background service provider system which includes a terminal which requests information, when the user selects a desired channel, on the selected channel and which displays on a background screen the imaged channel information received, to change/update the background screen, a gateway which requests information on the selected channel from a server providing the contents of the selected channel and which sets the background screen as the imaged channel information received according to the request for information on the channel, to change/update the background screen, and a content packaging server which downloads channel information, which is contents corresponding to the channel imaged according to a preset standard, and transmits the imaged channel information to the gateway.

The content-based dynamic background service provider system may further include a channel web server registered in the content packaging server beforehand through a URL, where the channel web server periodically collaborates with internal servers corresponding to the channel to receive current information, images and generates the received information, and transmits it together with a preset image map file in the channel information.

Another aspect of the invention is a mobile communication terminal for processing a plurality of contents received from at least one content provider server in a mobile communication system, the mobile communication terminal comprising: a content receiver module configured to receive a plurality of contents from at least one content provider server in a mobile communication system, wherein the content receiver module is further configured to separate the received contents into a plurality of layers; a handset operating system module configured to operate the terminal and run an application, the handset operating system module comprising a user interface; and a content management application module configured to synthesize the plurality of layers of the contents into one idle screen layer and provide it to an idle screen of the mobile communication terminal.

In the above mobile communication terminal, the content management application module may comprise an event controller configured to receive a content manipulation input via the user interface and distribute to a layer of the corresponding content. In the above mobile communication terminal, one content provided to the mobile communication terminal may occupy one layer, and wherein the content of a corresponding layer may be objectified to secure at least a partial area of the idle screen.

In the above mobile communication terminal, herein the content in each layer may be configured to individually be processed with a platform of the terminal and the corresponding content provider server. In the above mobile communication terminal, all of the contents for each layer synthesized to the idle screen layer may reside in a heap of a memory of the terminal.

In the above mobile communication terminal the content management application module may comprise a content setting portion configured to enable a user to select the layers to be synthesized to the idle screen from among the layered contents. In the above mobile communication terminal, the content management application module may comprise a position management portion configured to enable a user to set the arrangements and positions of the contents synthesized to the idle screen layer on the idle screen.

Another aspect of the invention is a method of processing a plurality of contents received from at least one content provider server in a mobile communication system, the method comprising: receiving, at a mobile communication terminal, a plurality of contents from at least one content provider server; separating the received contents into a plurality of layers; synthesizing the separated layers of the contents into one idle screen layer; and providing the synthesized idle screen layer to the idle screen of the mobile communication terminal in an idle mode.

In the above method, one content provided to the mobile communication terminal may occupy one layer, and wherein the content of a corresponding layer may be objectified to secure at least a partial area of the idle screen. In the above method, the content in each layer may be configured to individually be processed with a platform of the terminal and the corresponding content provider server.

In the above method, all of the contents for each layer synthesized to the idle screen layer may reside in a heap of a memory of the terminal. In the above method, the synthesizing may comprise: receiving a selection from a user on the layers to be synthesized to the idle screen from among the layered contents.

In the above method, the synthesizing may comprise: receiving a selection from a user on the arrangements and positions of the contents synthesized to the idle screen layer on the idle screen.

Another aspect of the invention is one or more processor-readable storage devices having processor-readable code, the processor-readable code which, when executed by one or more processors, performs a method of processing content received from at least one content provider server in a mobile communication system, the method comprising: receiving, at a mobile communication terminal, a plurality of contents from at least one content provider server; separating the received contents into a plurality of layers; synthesizing the separated layers of the contents into one idle screen layer; and providing the synthesized idle screen layer to the idle screen of the mobile communication terminal in an idle mode.

Another aspect of the invention is a method of providing a content-based, dynamic background screen service, the method comprising: requesting information, when a user selects a desired channel, on the selected channel; imaging contents corresponding to the channel according to a preset standard so as to generate channel information; downloading the generated channel information; and changing/updating the background screen based on the downloaded channel information.

The above method may, further comprise stopping the background screen changing/updating, when the user removes the selected channel from the background screen, and running a background screen deactivation. The above method may further comprise switching to another service via a user interface (UI). In the above method, the requesting may comprise sending a request to a server which provides contents in preset periods. In the above method, the contents of the background screen may be changed/updated in preset periods via PULL/PUSH.

Another aspect of the invention is a content-based dynamic background service provider system comprising: a terminal configured to request information, when a user selects a desired channel, on the selected channel and display on a background screen the imaged channel information received, to change/update the background screen; a gateway configured to request information on the selected channel from a server which provides the contents of the selected channel and set the background screen as the imaged channel information received according to the request for information on the channel, to change/update the background screen; and a content packaging server configured to download channel information, the channel information being contents corresponding to the channel imaged according to a preset standard, and transmit the imaged channel information to the gateway.

The above system may further comprise a channel web server registered in the content packaging server beforehand through a uniform resource locator (URL), the channel web server configured to periodically collaborate with internal servers corresponding to the channel to receive current information, image and generate the received information, and transmit it to ether with a preset image map file in the channel information.

In the above system, the gateway may be configured to convert the imaged channel information provided according to the information request on the channel into a form configured to be transmitted to the terminal, and package it into a preset standard to transmit to the terminal. In the above system, the terminal may be configured to stop the background screen change/upgrade when the user removes the selected channel from the background screen and run a background screen deactivation.

In the above system, the terminal may be configured to display a focus area on the image of the screen based on image map information included in the channel information, and operate an external application connected with the focus area when the user presses a confirm button.

In the above system, the terminal may be configured to manage images for various channels provided from the content packaging server for switching to another service through a user interface (UI). In the above system, the terminal may be configured to change/upgrade the contents of the background screen in preset periods via PULL/PUSH.

Still another aspect of the invention is a mobile communication terminal for processing a plurality of contents received from at least one content provider server in a mobile communication system, the mobile communication terminal comprising: means for receiving a plurality of contents from at least one content provider server; means for separating the received contents into a plurality of layers; means for synthesizing the separated layers of the contents into one idle screen layer; and means for providing the synthesized idle screen layer to the idle screen of the mobile communication terminal in an idle mode.

BRIEF DESCRIPTION OF THE DRAWINGS

FIG. 16 is a flow diagram illustrating service procedures for providing a content-based background screen according to an embodiment of the invention.

DETAILED DESCRIPTION OF CERTAIN INVENTIVE EMBODIMENTS

Figure 1:
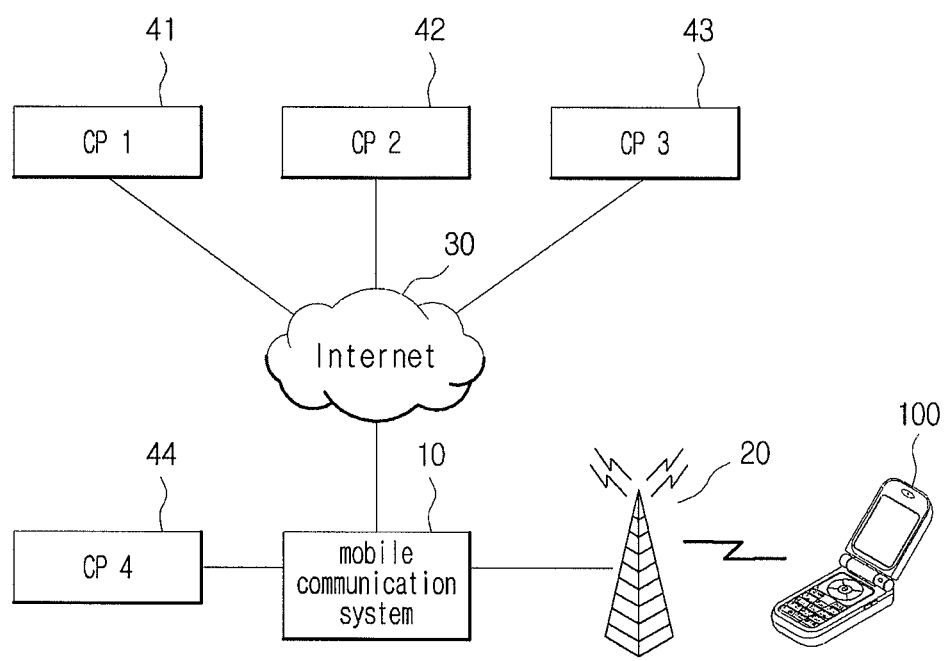
FIG. 1 is a diagram schematically illustrating a mobile communication system environment in which contents are provided to a mobile communication terminal according to an embodiment of the invention.

As mobile communication terminals develop, services provided over mobile communication terminals and applications processed by mobile communication terminals have increased in number and have become more varied. For example, there are functions being provided for content use and financial transaction services, etc., that use mobile communication terminals. One of such is wireless Internet access using a mobile communication terminal, whereby users have been enabled to download the desired contents using mobile communication terminals regardless of time or location.

In such a system of downloading contents using a mobile communication terminal, the user initiates an Internet access using the mobile communication terminal, and the server of the communication connection business makes a connection for the mobile communication terminal and the content provider server of interest, after which the contents may be downloaded from the content provider server of interest through the mobile communication terminal. This system entails an unnecessary waste of time for communication connection and also entails costs when connecting to the content provider server of interest.

In view of such drawbacks, an application has recently been developed for service that provides contents on an idle screen of a mobile communication terminal when the terminal is an idle mode. However, this service for providing contents on an idle screen can only provide one type of content, so that in order for the user to change the desired content, the application of the terminal has to be changed.

Also, the terminal of a communication system generally provides various applications such as weather, stock, news, traffic, and mail information, etc., from a server through the background screen of a display part, and in current background screen services, applications prepared by content packaging servers (hereinafter referred to as CP servers occupy and change the background screen.

In such typical background screen services, popups in which the corresponding applications are displayed are based on wireless Internet platform for interoperability (WIPI) applications. WIPI started in a national policy business in 2001 with the goal of reducing national squandering by having mobile communication businesses use the same platform, where a wireless Internet platform refers to the base software in a terminal that plays a role similar to an operating system (OS) in a personal computer.

Each typical mobile communication business had hitherto developed and used a wireless Internet platform of a different system, so that content providers had to implement the same contents in several platforms. This created several elements of unnecessary squandering in content production and service, and WIN was developed with the goal of reducing these elements of squandering.

However, with typical services based on WWI applications, it is inconvenient to freely change/upgrade, etc., so that recompiling is required when adding a function that had not been planned for. Since more resources are put into such popup applications than for regular applications, there is little participation from regular CP servers, and in the case of OEM-based services, it is difficult to provide multi-media interactive services by text or simple-image transmission.

Moreover, from the perspective of the CP server, since services based on WIPI applications do not allow free implementation of matter desired by the CP server on the background screen, there is a need for a dynamic background screen service that does not rely on WIPI applications, i.e. platform bases.

As embodiments of the invention allow for various changes and numerous embodiments, particular embodiments will be illustrated in drawings and described in detail in the written description. However, this is not intended to limit the invention to particular modes of practice, and it is to be appreciated that all changes, equivalents, and substitutes that do not depart from the spirit and technical scope of the invention are encompassed in the claims. In describing each figure, like reference numerals are used for like elements throughout.

While such terms as "first" and "second," etc., may be used to describe various components, such components must not be limited to the above terms. The above terms are used only to distinguish one component from another. For example, a first component may be referred to as a second component without departing from the scope of rights of the invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Embodiments of the invention will be described below in detail with reference to the accompanying drawings. For better understanding overall in describing aspects of the invention, the same reference numerals are used for the same means, regardless of the figure number.

FIG. 1 is a diagram schematically illustrating a mobile communication system environment in which contents are provided to a mobile communication terminal according to an embodiment of the invention.

Referring to FIG. 1, a mobile communication terminal 100 based on an aspect of the invention wirelessly accesses a mobile communication system 10 through a base station 20. The mobile communication system 10 connects to the Internet 30, while the Internet 30 has access to several content provider servers 41, 42, 43 to provide contents. Further, there may also be a content provider server 44 that is configured to be directly connected to the mobile communication system 10.

The mobile communication system 10 is composed operator and home position registrar gateway, etc., and performs both voice and data communications. The Internet 30 includes general public networks, and content provider servers 41, 42, 43 that provide various contents connect to the mobile communication system 10 through gateways, using the Internet 30 as a medium. By means of the network of the mobile communication system 10, the content provider servers 41, 42, 43 connected to the mobile communication system 10 through the Internet 30 and the content provider server 44 connected directly with the mobile communication system 10 may access the mobile communication terminal 100 at the base station 20. In this way the content provider servers provide contents to the mobile communication terminal 100 through the mobile communication system 10.

Here, a content manager server (not shown) may be equipped in the mobile communication system 10 for managing the contents provided by the several content provider servers 41, 42, 43, and 44.

Next, a mobile communication terminal 100 based on an aspect of the invention will be described with reference to FIG. 2.

Figure 2:
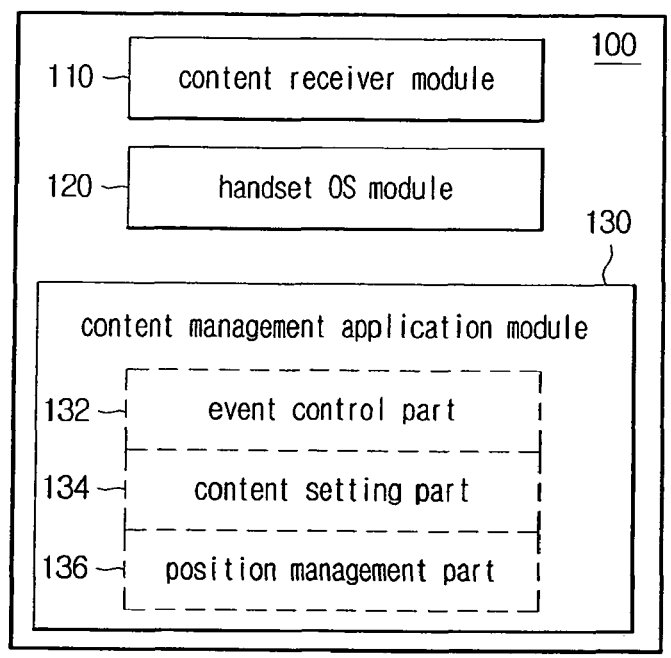
FIG. 2 is a diagram illustrating the function blocks of a mobile communication terminal having multiple contents provided on the idle screen according to an embodiment of the invention.

FIG. 2 is a diagram illustrating the function blocks of a mobile communication terminal having multiple contents provided on the idle screen according to an embodiment of the invention.

Referring to FIG. 2, the mobile communication terminal 100 having multiple contents provided on the idle screen according to an aspect of the invention is a mobile communication terminal that includes a communication part which transmits/receives wireless data to/from the mobile communication system 10, a control part which processes the receiving/placing of phone call signals, an input part for receiving the input signals of the user, a display part for displaying information to the user, an interface part which provides the user with various terminal functions, and a memory which stores and manages data, and is characterized by including a content receiver module 110 which receives the contents provided through the mobile communication system, a handset operating system module 120 which operates the terminal and runs applications, and a content management application module 130 which manages the received contents.

The communication part accesses the base station 20 of the mobile communication system 10 to perform the functions of transmitting/receiving wireless data and communicating. The communication part achieves the communication with the base station through a pilot channel, paging channel, and traffic channel, etc.

The control part operates the terminal, controls the overall processing operations of the terminal, and processes the receiving/placing operations of phone call signals with the mobile communication system through the communication part for a connection. Also, it collaborates with the interface part to run a number of programs and inputs/outputs data in/from the memory.

The input part receives the user's voice as input by means of a microphone, and receives signals from the user as input for manipulating the terminal using a means for receiving input signals, such as a keypad.

The display part provides the user with information processed by the terminal. The display part includes a liquid crystal display device which displays the processing mode of the terminal in the screen, a light emitting lamp which transfers information through the light emission of light emitting elements, a vibration device which transfers information through the vibration of a vibration motor, and a speaker which acoustically transfers information through ringing or sounds, etc.

The interface part performs the function of helping the user to readily use the basic functions and various additional functions of the terminal.

The handset operating system module 20 is a program that operates the terminal to serve in supporting the user to allow the use of communication and various functions.

The content receiver module 110 receives several contents provided while accessing the mobile communication system 10 through the communication part. Here, the received contents are each separated into layers. In other words, the contents provided from a first content provider server 41 is received separated to Layer 1, while the contents provided from a second content provider server 42 is received separated to Layer 2.

The content management application module 130 is an application program that synthesizes the contents separated into layers received from the content receiver module 110 into one idle screen layer to provide an idle screen for the display part of the terminal. The content management application module 130 includes an event control part 132, a content setting part 134, and a position management part 136.

Here, one content occupies one layer to perform an independent function. Also, the content included in a layer is objectified for processing, where the objectified content object may be changed in size and position when synthesized to the idle screen layer by the content management application module 130. Changing the size and position of the objectified content object is managed by the content management application module 130, and the content providing of each content object and performing the content are performed independently. That is, the size and position of the content object in the layer are processed by the content management application module 130, while the processing for the content providing of the content object or the content performing is proceeded with independently by the content itself and is affected by the content provider server providing the corresponding content.

As such, the content in each layer individually proceeds with the processing with the platform of the terminal and the corresponding content provider server, and the content management application module 130 manages the multiple contents separated into layers and synthesizes a single idle screen layer. Here, the multiple contents synthesized into the idle screen layer all reside in a heap in the memory, such that the individual processing of each may be processed independently.

When the user uses one of the multiple contents provided on the idle screen, the event control part 132 distributes the manipulation signal or key input information to the layer of the corresponding content for processing. That is, the event control part 132 receives a content manipulation input from the user through the user interface and distributes to the layer of the corresponding content. When a manipulation input of the content selected from the multiple contents provided on the idle screen or a key event request from the user is distributed to the layer of the corresponding content, it is transmitted to the corresponding content provider server or is used in an independent processing procedure of the corresponding content.

The content setting part 134 allows the user to select the desired contents from the contents provided, and provides the selected contents after they are synthesized to the idle screen layer. That is, it allows the user to select the layer to synthesize to the idle screen layer from among the contents separated into layers received at the content receiver module 110, and synthesizes the selected layers to the idle screen layer. Here, a content setting menu interface may be provided to the user for selecting the contents provided on the idle screen.

The position management part 136 enables arranging the multiple contents provided on the idle screen in areas preferred by the user or setting the position. That is, when the content layers received from the content receiver module 110 and selected at the content setting part 134 are synthesized to the idle screen, the contents of each layer are objectified and the positions of the objects may be set where they will be arranged on the idle screen. Here, a position managing menu interface may be provided to the user for adjusting the position and arrangement of the contents to be provided on the idle screen.

Figure 3:
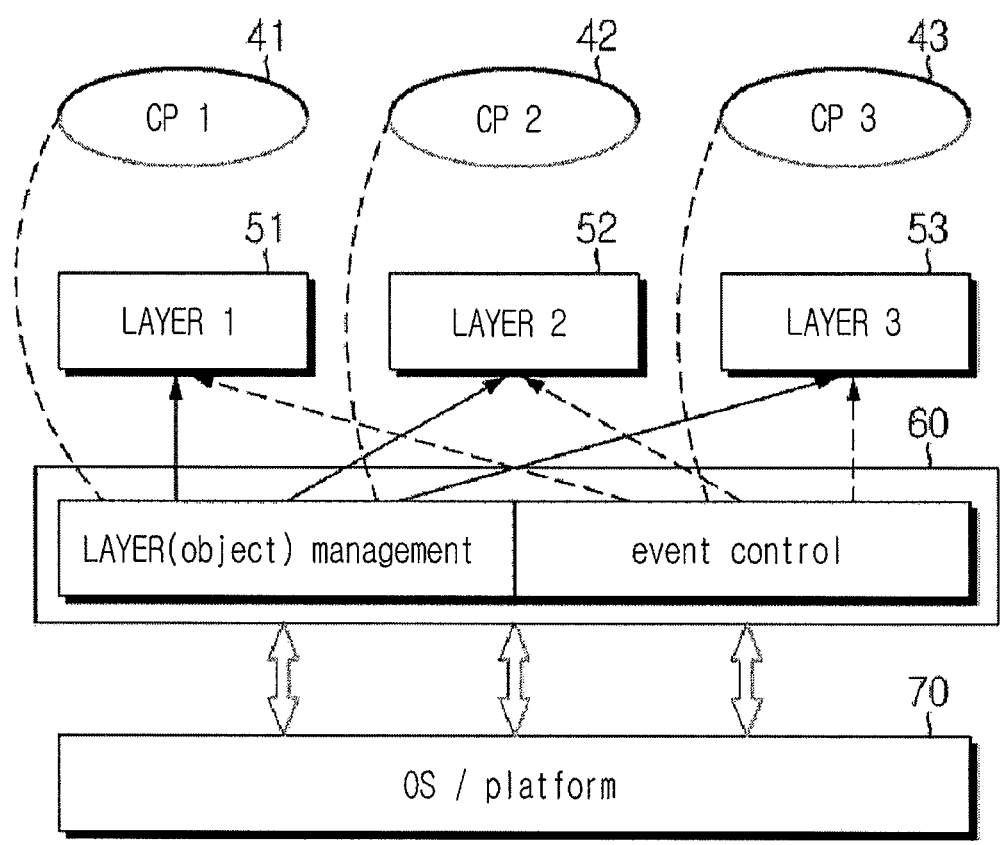
FIG. 3 is a program diagram of a mobile communication terminal having multiple contents provided on the idle screen according to an embodiment of the invention.

FIG. 3 is a program diagram of a mobile communication terminal having multiple contents provided on the idle screen according to an embodiment of the invention.

Referring to FIG. 3, each of the content provider servers 41, 42, 43 provides different contents. The contents provided by the respective content provider servers 41, 42, 43 are processed with each content allotted to one layer, within the terminal. For example, the content provided from a first content provider server 41 is allotted to a first layer 51 and processed, and the content provided from a second content server 42 is allotted to a second layer 52 and processed. Here, the contents allotted to each layer in the terminal are objectified and processed.

The content objects thus allotted to layers are managed by a content management application 60, where the content management application 60 selects and synthesizes each of the layers and processes the distribution to corresponding layers when managing the positions of the objects and when there is an occurrence of an event, without being involved in the content matter or the provided service. The contents provided for each of the layers are managed as objects, where the layers to be synthesized to the idle screen layer are selected and the arrangement and positions of the objects to be synthesized to the idle screen layer are set. When the contents are selected and the arrangement of objects is set, they are synthesized as one into the idle screen layer, to be provided on the LCD of the mobile communication terminal in an idle mode. The contents synthesized here are made to reside in the memory heap of the mobile communication terminal.

Also, when there is a key event or a manipulation input from among the contents provided from the user, the content management application 60 proceeds with the processing for distributing into layers 51, 52, 53 for each content corresponding to the event. The event or manipulation input thus distributed is independently processed in the corresponding layer. That is, it is processed within the content of the corresponding layer or processed in collaboration with the corresponding content provider server. Here, the processing is proceeded with individually with the platform 70 of the mobile communication terminal and the corresponding content provider server (e.g. 41), independently of the content management application 60.

The platform/operating system 70 of the mobile communication terminal acts as an interface, which allows the independent processing of the content objects, reflects the processing results of the content management application 60, provides the contents synthesized to the idle screen of the terminal LCD, and receives event and manipulation input from the user.

Figure 4:
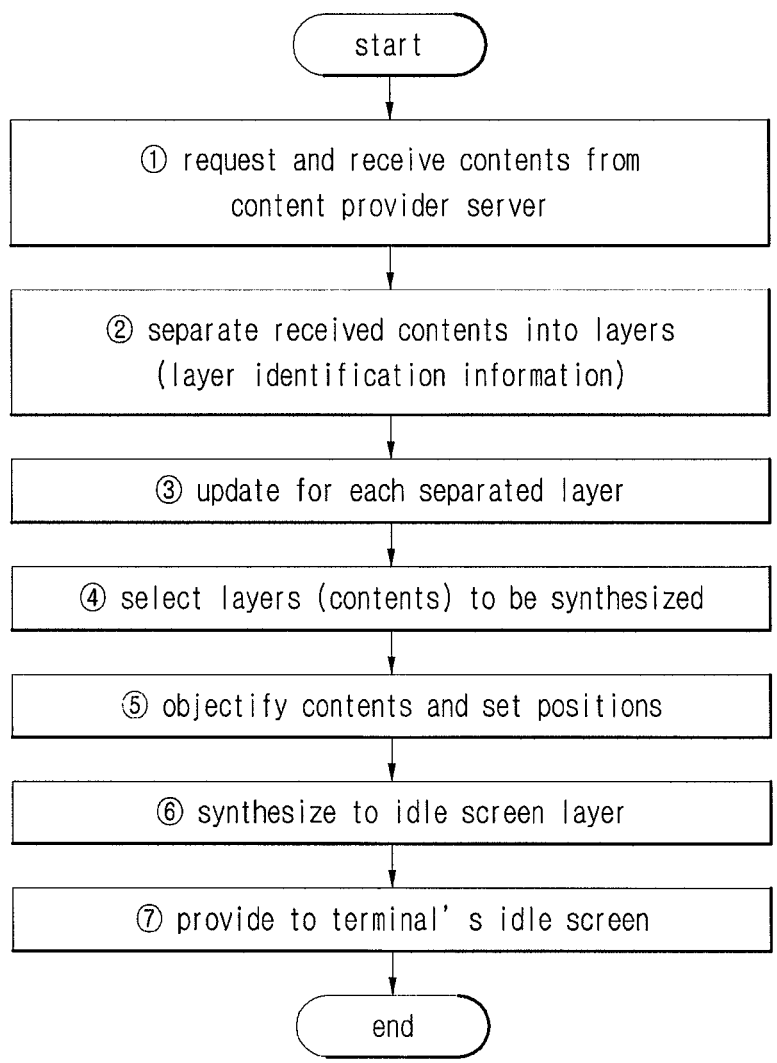
FIG. 4 sequentially illustrates the procedures for a method of providing multiple contents to the idle screen of a mobile communication terminal according to an embodiment of the invention.

FIG. 4 sequentially illustrates the procedures for a method of providing multiple contents to the idle screen of a mobile communication terminal according to an embodiment of the invention.

Referring to FIG. 4, first, the contents are requested from multiple content provider servers in a mobile communication system environment, at which the corresponding servers provide the contents to the mobile communication terminal. The contents may be received by the mobile communication terminal directly from the content provider server, or may be received by the mobile communication terminal after being received by a content management server included in the mobile communication system to undergo preprocessing procedures. The preprocessing may include format conversion, etc., for providing the contents to the mobile communication terminal. (1)

When multiple contents are received at the mobile communication terminal, an operation of allotting each content to a layer is proceeded with. Each content is allotted to a layer and separated, such that each content is treated independently. Here, layer identification information is set for the layers to which each of the contents is allotted and separated. (2)

When the layers are separated in this way, the multiple contents received are provided to the corresponding layers based on the respective layer identification information, and an update is processed in the corresponding layer to reflect the contents provided. (3)

Next, from among the contents separated into layers, the contents selected which are to be provided to the idle screen of the mobile communication terminal. Here, a selection menu interface may be provided to the user. Also, this operation is proceeded with when the user requests the selection of contents, and may be omitted when there is no such request, (4)

The selected contents are objectified for each layer, and the positions where they are to be arranged on the idle screen are set. Again, a position managing menu interface may be provided to the user. In addition, this operation is also proceeded with when the user requests the position managing of contents, and may be omitted when there is no such request. (5)

When the positions of the content objects where they will be arranged on the idle screen are set, the multiple layers in which each object is included are synthesized to one idle screen layer. While there are multiple content objects in one layer in the idle screen layer thus synthesized, each of the content objects is operated independently to one another. (6)

The idle screen layer thus synthesized is displayed on the terminal's display window when the mobile communication terminal is in an idle mode. With this idle screen layer, multiple contents are displayed in one screen, and the contents are each operated by independent processing procedures. (7)

A description will now be given, with reference to FIG. 5, for an example in which multiple content objects are synthesized in the idle screen of a mobile communication terminal.

Figure 5:
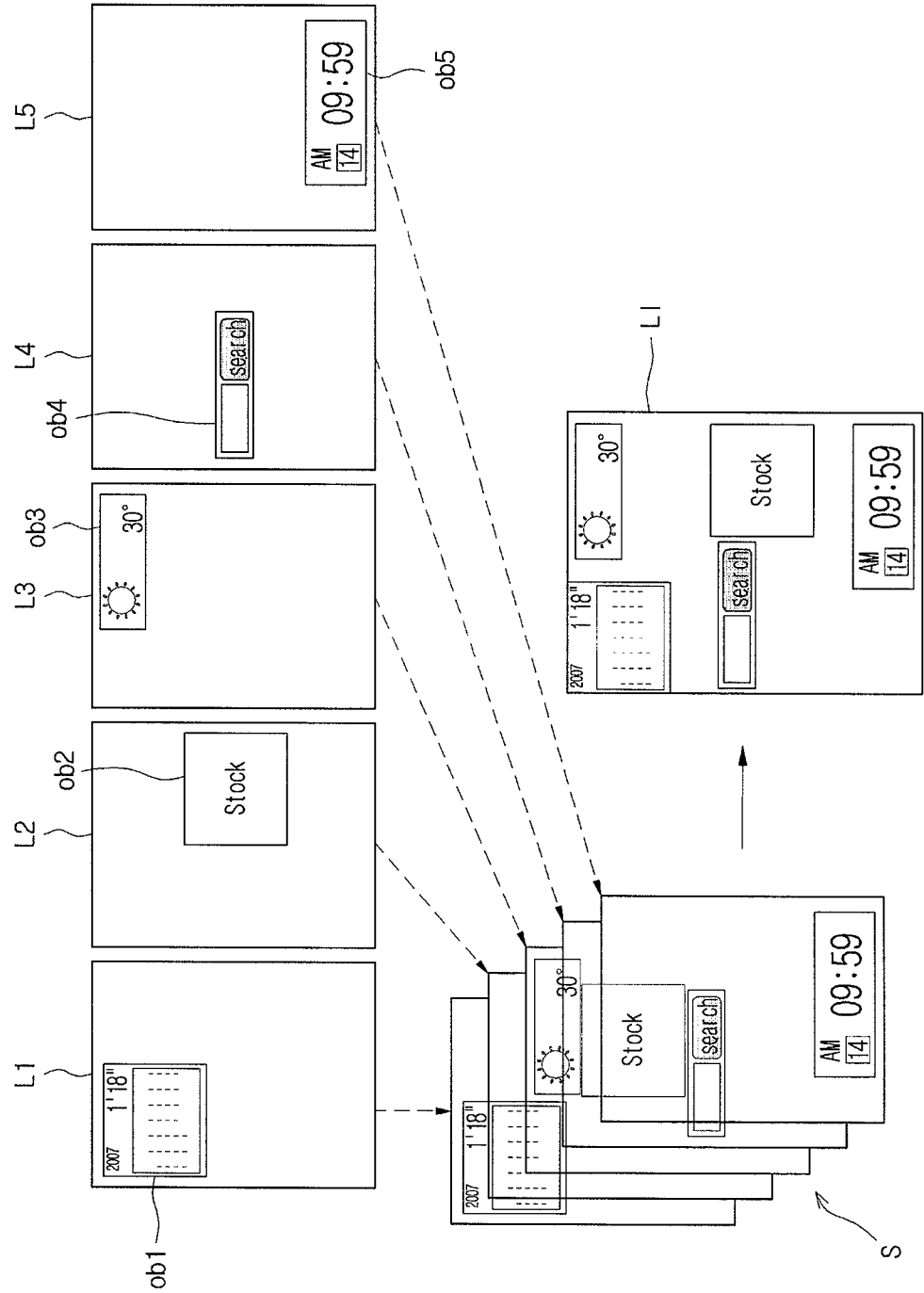
FIG. 5 illustrates an idle screen synthesizing procedure for a mobile communication terminal having multiple contents provided on the idle screen according to an embodiment of the invention.

FIG. 5 illustrates an idle screen synthesizing procedure for a mobile communication terminal having multiple contents provided on the idle screen according to an embodiment of the invention.

Referring to FIG. 5, the multiple contents provided to the mobile communication terminal are first allotted to respectively separated layers, and the contents are objectified in the corresponding layers. That is, the received contents may be allotted to, for example, five layers L1, L2, L3, L4, and L5, as in the figure. In the first layer L1, calendar contents are objectified and positioned as an object ob1. In the second layer L2, stock information contents are objectified and positioned as an object ob2. In the third layer L3, weather information contents are objectified and positioned as an object ob3, in the fourth layer L4, search window contents are objectified and positioned as an object ob4, in the fifth layer L5, time information contents are objectified and positioned as an object ob5.

These five layers are synthesized (S) into one layer, and as a result of this synthesis, the idle screen layer L1 is generated. The contents of the above five are all provided in this idle screen layer L1. Also, while each of the contents is provided in one idle screen, layers exist that are separate from one another, where each layer is processed independently.

Figure 6:
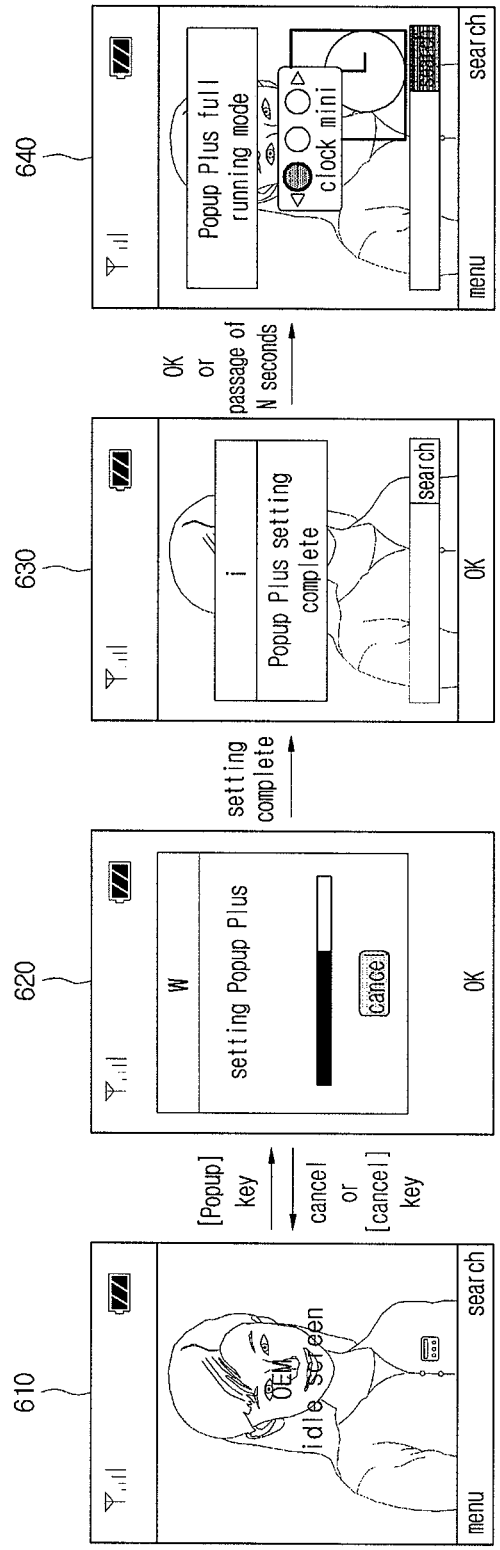
FIG. 6 illustrates an embodiment for running an idle screen content providing service, implemented by applying an aspect of the invention.

FIG. 6 illustrates an embodiment for running an idle screen content providing service, implemented by applying an aspect of the invention.

For clearer understanding and convenient description of the aspects of the invention, the idle screen content providing service will be referred to as "Popup Plus," and the contents objectified to a layer will be referred to as a "mini" (This applies also to the drawings and the description of the drawings). However, it is apparent that this neither limits the technical scope encompassed by the invention nor changes the scope of rights.

Referring to FIG. 6, reference numeral 610 represents the OEM idle screen, that is, the basic idle screen of a mobile communication terminal 100. The user may press a preset key (e.g. a "popup" key) while in an OEM idle screen mode, to run Popup Plus. For example, when the user presses the popup key in the OEM idle screen 610, the OEM idle screen 610 proceeds through the screen modes of reference numerals 620 and 630 and afterwards changes to the Popup Plus full running mode of reference numeral 640. Here, the Popup Plus full running mode refers to the mode having Popup Plus in the foreground. That is, it refers to a Popup Plus set mode, the mode in which each function is available. In the Popup Plus full running mode of reference numeral 640, the minis that may be run are set to the "search mini" and the "clock mini."

Figure 7:
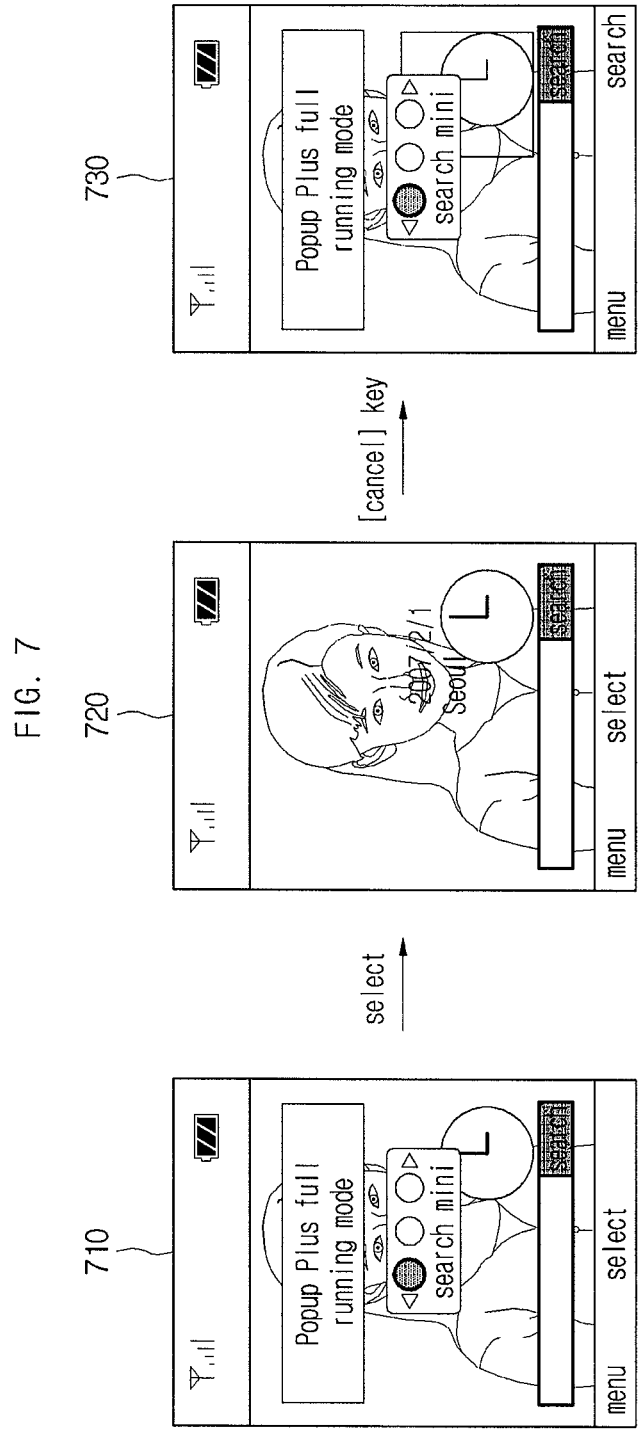
FIG. 7 illustrates an embodiment for selecting a mini in Popup Plus full running mode, implemented by applying an aspect of the invention.

FIG. 7 illustrates an embodiment for selecting a mini in Popup Plus full running mode, implemented by applying an aspect of the invention.

As illustrated in FIG. 7, when the user presses a preset key (e.g. a "select" key), in the Popup Plus full running mode 710, the Popup Plus full running mode 710 is switched to a mode 720 in which the function of the corresponding mini may be used. That is, the mini focused in reference numeral 710 is the search mini, and when the user presses the "select" key in this state, the user can use the search mini of reference numeral 720. Also, the user may press a preset key (e.g. a "cancel" key) while in the mode of reference numeral 720, to return to the Popup Plus full running mode 730, FIG. 8 illustrates an embodiment for moving the focus in Popup Plus full running mode, implemented by applying an aspect of the invention.

Figure 8:
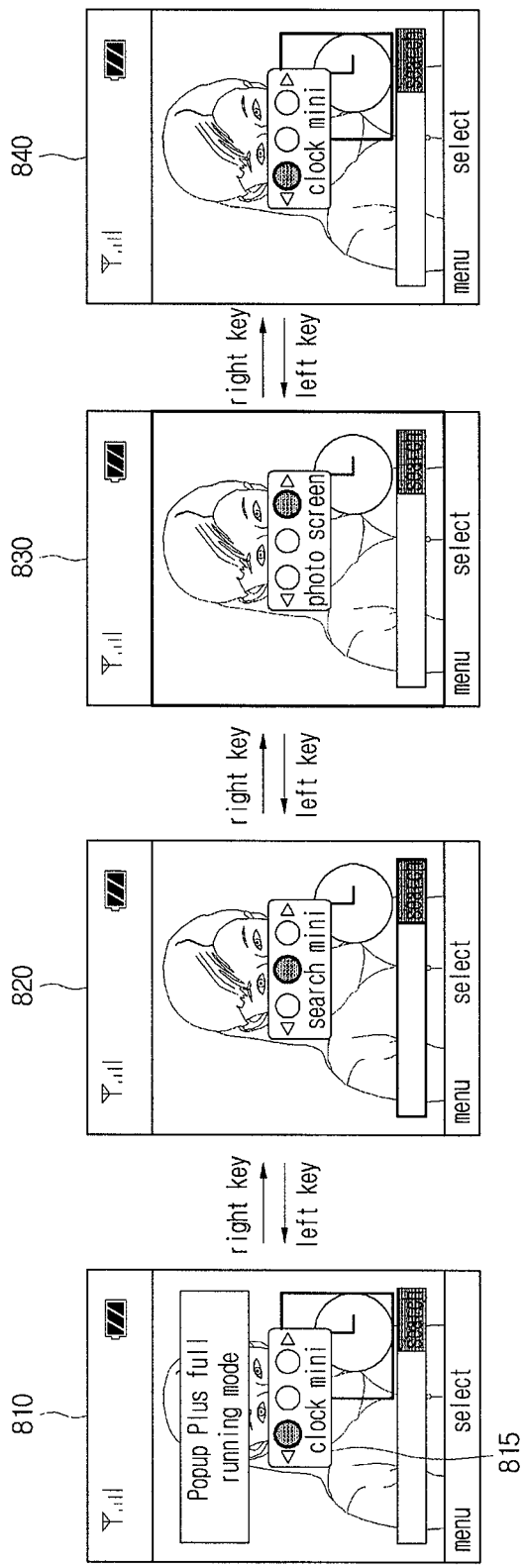
FIG. 8 illustrates an embodiment for moving the focus in Popup Plus full running mode, implemented by applying an aspect of the invention.

Referring to FIG. 8, when in the Popup Plus full running mode 810, a mini list window 815 is displayed with which the focus may be selected on the screen. In the mini list, the layers in which the contents are objectified may be aligned from left to right in order of level. For example, the object displayed on the furthest right may be a screen.

In addition, when the user presses a preset key (e.g. a "right" key or "left" key) in the Popup Plus full running mode 810, the focus may be moved to the next or previous mini 820, 830.

In addition, when the user presses the "right" key while at the mini positioned on the furthest right, the focus may be moved to the mini positioned on the furthest left (e.g. move from reference numeral 830 to reference numeral 840).

In addition, when the user presses the "left" key while at the mini positioned on the furthest left, the focus may be moved to the mini positioned on the furthest right (e.g. move from reference numeral 840 to reference numeral 830).

Figure 9:
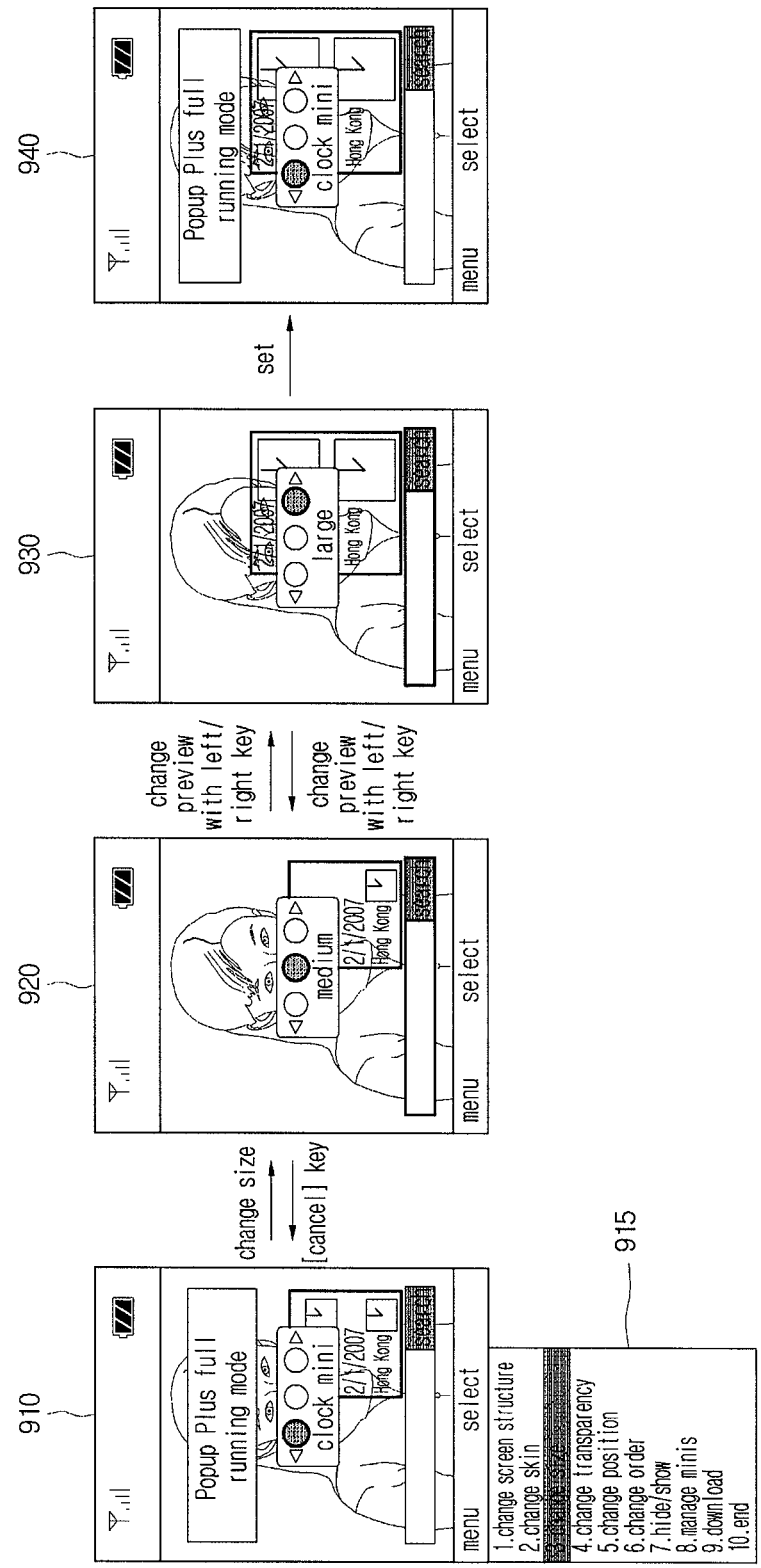
FIG. 9 illustrates an embodiment for changing the size of a mini in Popup Plus full running mode, implemented by applying an aspect of the invention.

FIG. 9 illustrates an embodiment for changing the size of a mini in Popup Plus full running mode, implemented by applying an aspect of the invention.

As illustrated in FIG. 9, the user may change the size of the mini on which the focus is currently positioned. However, while it will be assumed, for convenient description and clearer understanding of the invention, that the size of the minis can be changed to large/medium/small, it is apparent that this does not mean that the scope of claims is reduced.

The user may select the change size option 915 from among the menu options to change the size of the mini on which the focus is positioned (e.g. move from reference numeral 910 to 920). Here, the user may set the size of the mini (e.g. move from reference numeral 920 to 930 or from reference numeral 930 to 920) while checking the preview, using a preset key (e.g. the "right" key or "left" key).

Also, the user may use a mini of a set size (e.g. move from reference numeral 930 to 940) by selecting a preset option (e.g. the "set" option).

Figure 10:
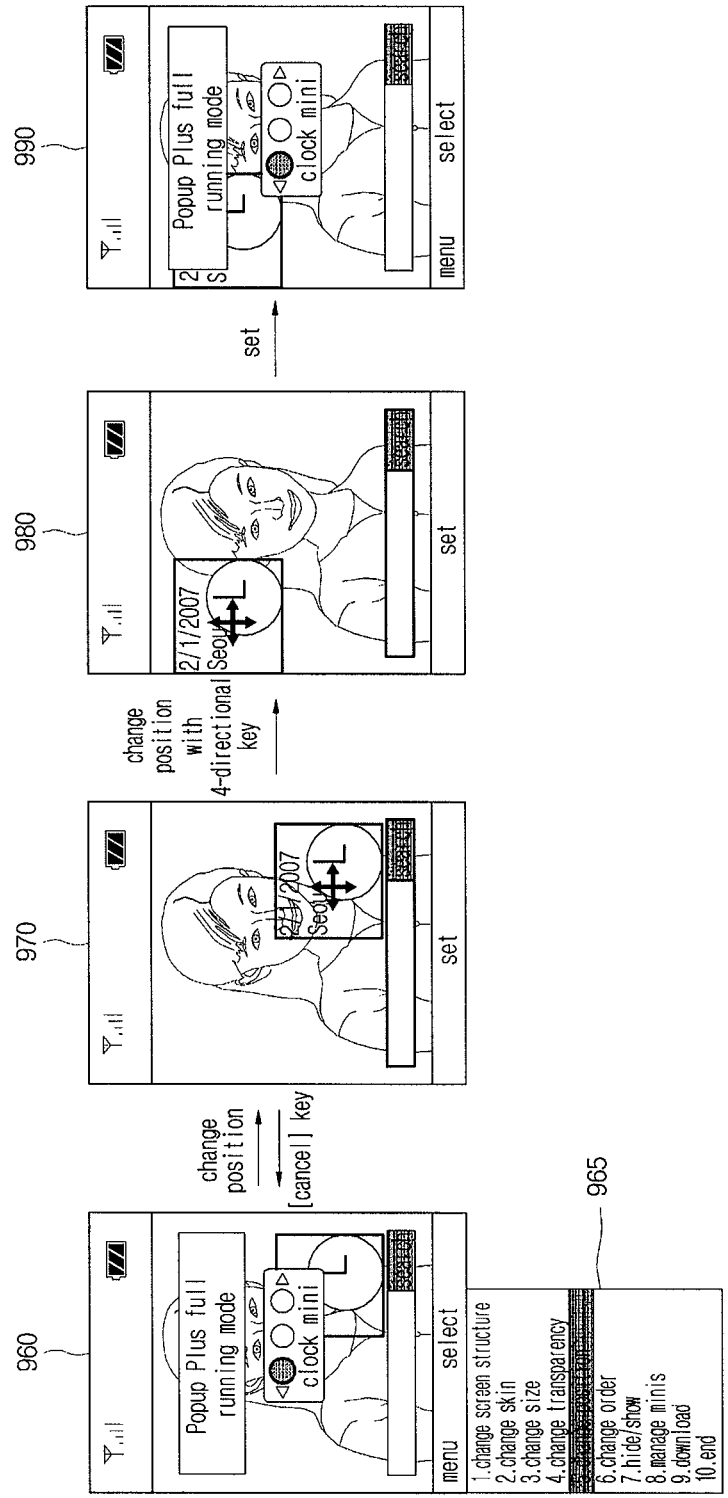
FIG. 10 illustrates an embodiment for changing the position of a mini in Popup Plus full running mode, implemented by applying an aspect of the invention.

FIG. 10 illustrates an embodiment for changing the position of a mini in Popup Plus full running mode, implemented by applying an aspect of the invention.

The user may select the position change option 965 from among the menu options to change the position of the mini on which the focus is positioned (e.g. move from reference numeral 960 to 970). Here, the user may move the mini to a desired position on the screen (e.g. move from reference numeral 970 to 980) using a preset key (e.g. the "4-directional" key).

In addition, the user may select a preset option (e.g. the "set" option) to use the mini which has changed position (e.g. move from reference numeral 980 to 990).

Figure 11:
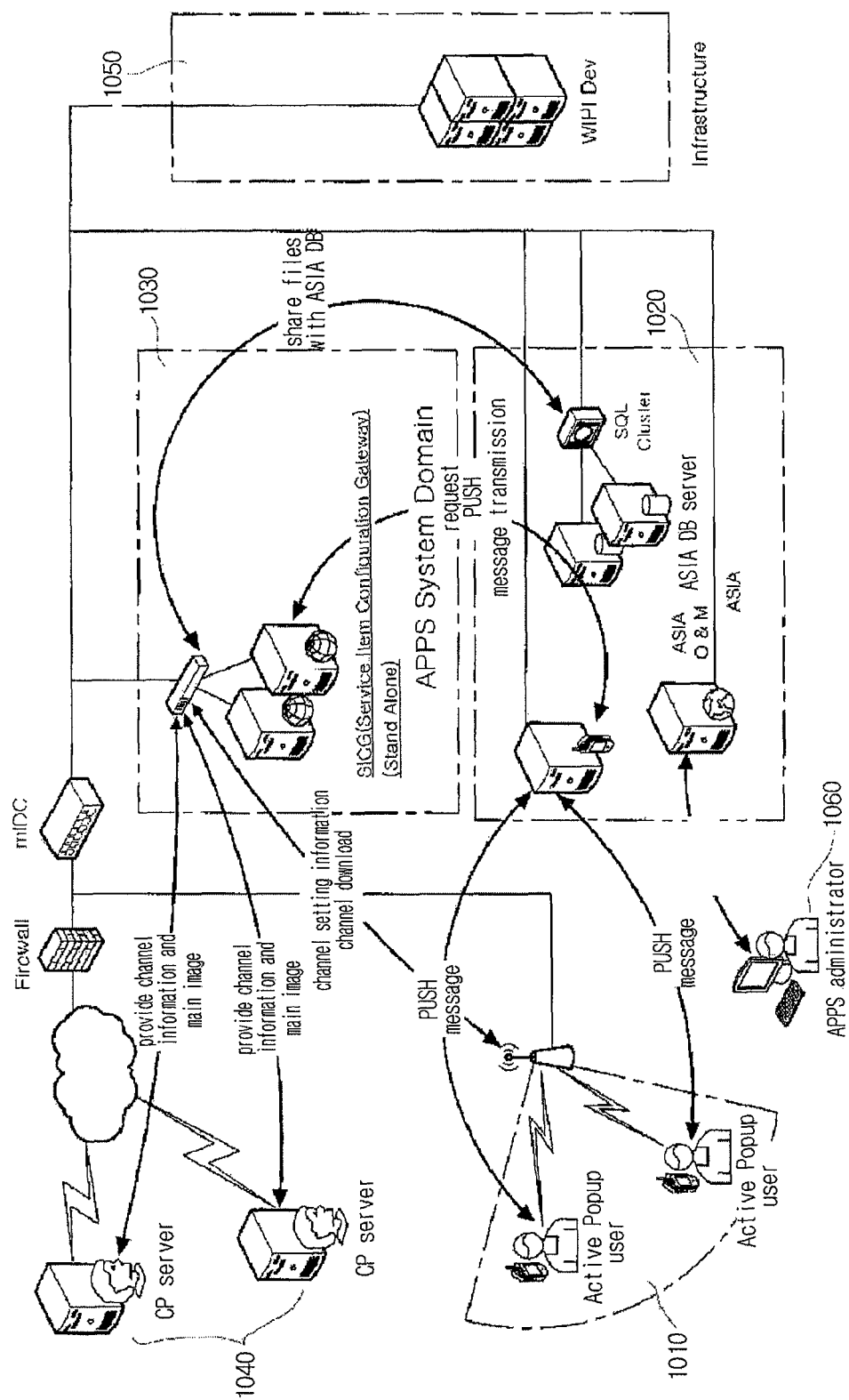
FIG. 11 is a block diagram illustrating the structure of a background screen service provider system according to an embodiment of the invention.

FIG. 11 is a block diagram illustrating the structure of a background screen service provider system according to an embodiment of the invention.

An aspect of the invention provides a service in which the application only acts as a manager, with the actual background using contents provided by a content packaging server, unlike conventional services in which the application prepared by a WIN application-based content packaging server directly occupies and changes the background screen. Thus, there is one application that occupies the background screen, and various contents are used after they are downloaded through the application in a channel type.

Referring to FIG. 11, a background screen service system is composed of ASIA 1020, which acts as an active popup server system (APPS) to exchange PUSH messages with active popup users 1010, a service item configuration gate ay (SICG) 1030, which provides channel setting information and channels, content packaging servers 1040 which provide channel information and main images with the service gateway 1030, and a WIPI (wireless Internet platform for interoperability) device 1050.

The structure of such a service system will now be described using a schematic structure according to an embodiment of the invention for convenience of description.

Figure 12:
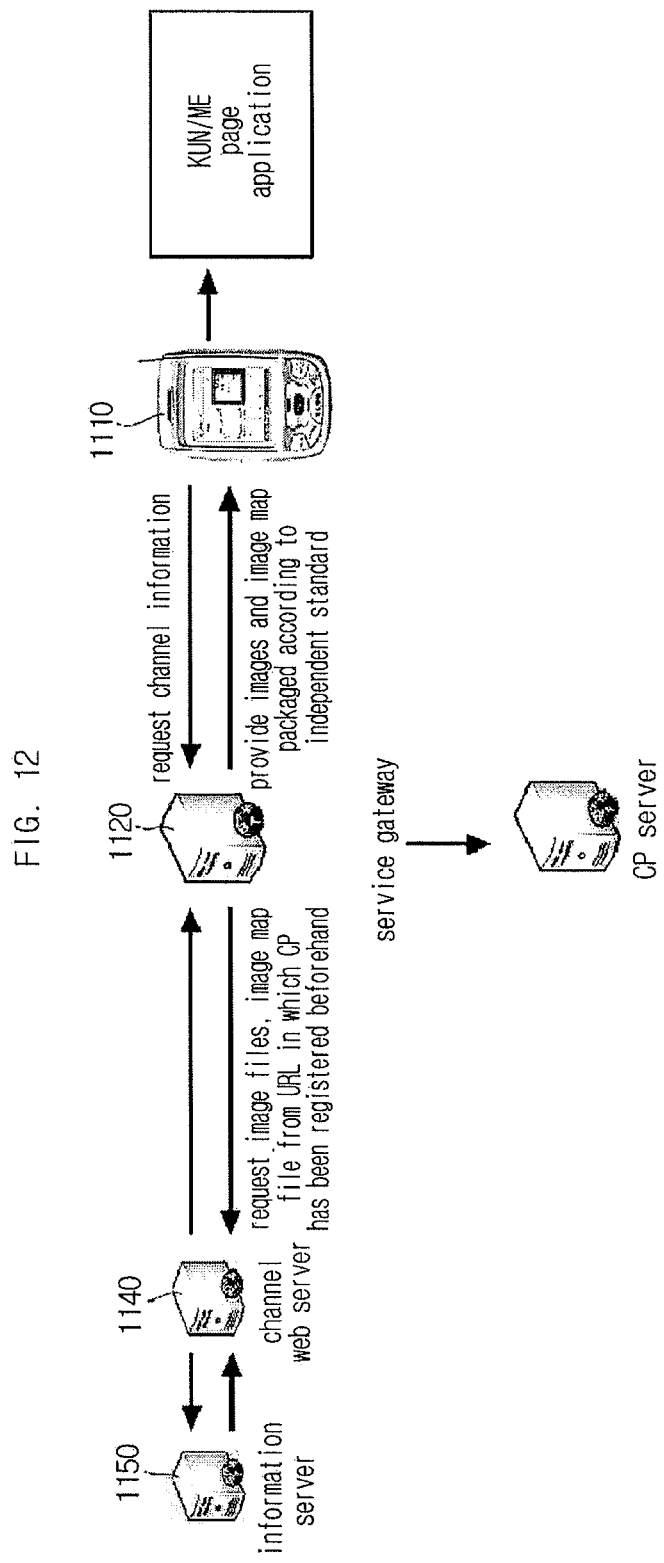
FIG. 12 is a schematic block diagram of the system structure illustrating an example of providing the popup my channel service according to an embodiment of the invention.

FIG. 12 is a schematic block diagram of the system structure illustrating an example of providing the Popup my channel service according to an embodiment of the invention.

Referring to FIG. 12, the background screen service system includes a terminal 1100 that displays the content-based Popup My Channel application, a service gateway 1120 that provides images packaged according to an inside standard and an image map, a content packaging server 1130 that manages the contents, a channel web server 1140, and an information server 1150.

The terminal 1100 request channel information, which is to be displayed on the background screen, from the service gateway 1120. Here, the channel information is requested automatically periodically or when the popup is activated. Also, the terminal 1100 analyzes the images and image map file provided from the service gateway 1120 to be displayed on the display part, and displays a focus area on the screen based on the provided image map information when the user presses an up/down/left/right button.

In addition, when the user presses the OK button, the terminal 1100 operates an external application or an external KUN/ME page connected to the corresponding area. Then, the user may thus access detailed information and contents easily and immediately. Here, the charge for the images and image map information regarding this channel is free by default.

The service gateway 1120 processes the authentication of the content packaging server 1130 and analyzes the image files and image map files received from the content packaging server 1130 to do a validity check. Also, the service gateway 1120 converts the images to a form that can be transmitted to the terminal 1100 (JPG, BMP→SIS) and packages them, to transmit the detailed information, user list, and set user list for each item.

The content packaging server 1130 performs URL (uniform resource locator) registration with the corresponding channel servers beforehand, receives the information of the corresponding channels from the corresponding channel servers to transmit it to the service gateway 1120, and facilitates the exposure of and access to profit-generating contents through the channels provided. In this way, a business may increase the sales of the contents.

The channel web server 1140 periodically collaborates with the information server 1150 to receive current information on the channel, generates the received current channel information by periodically imaging (Channel_image.bmp) the current information on the corresponding information, generates a predefined image map file, and transmits the generated images and image map file to the service gateway 1120. Here, the image supports files such as BMP, PNG, SIS files, etc., and the image map (Channel_image.map) is produced according to an inside standard and is in the form of a text file. Also, the channel web server 1140 provides external link information through the button manipulation of the user, and is composed of the coordinates of each area of the image map, a link 5UN/ME page or application ID, etc.

The information server 1150 manages the information on channels for Text Message Land, mail, stock, weather, mail, news, show business information, etc., and transmits the information of the corresponding channels according to the request of the channel web server 1140.

Now the Popup My Channel application displayed on the display part of the terminal 1100 will be described with reference to the appended drawings.

Figure 13:
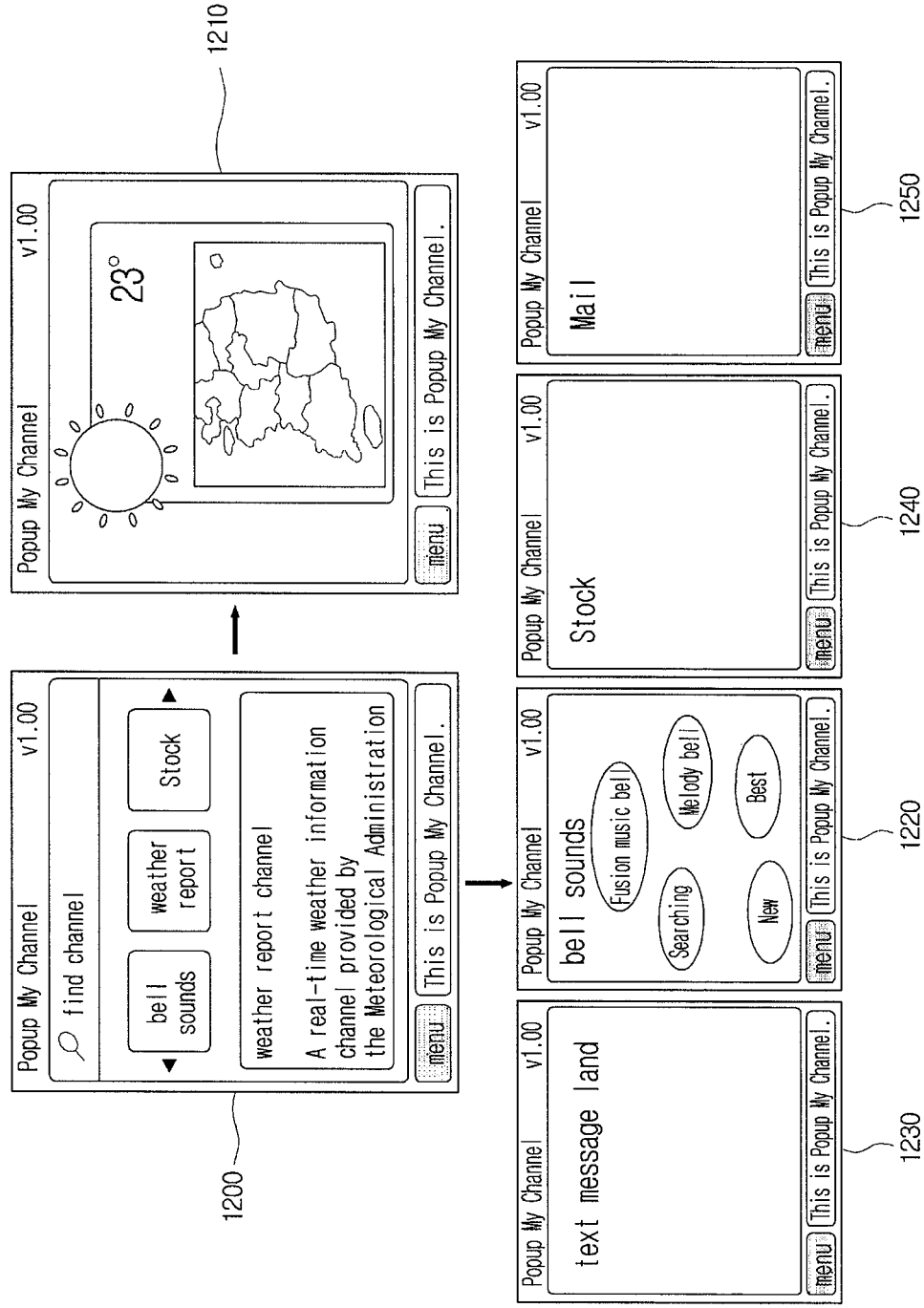
FIG. 13 is a block diagram illustrating the popup my channel applications displayed on the terminal according to an embodiment of the invention.

FIG. 13 is a block diagram illustrating the Popup my channel applications displayed on the terminal according to an embodiment of the invention.

The display part of the terminal 1100 displays the channel screen 1200 (hereinafter referred to as Popup My Channel screen), and when the title "find channel" is displayed at the upper end of the Popup My Channel screen 1200, a channel list screen is displayed in the area underneath. Here, left/right buttons are formed in the channel list screen area, so that the user may select various channels provided by the content packaging servers 1130. In the area beneath the channel list screen in the Popup My Channel screen 1200, an introduction of the selected channel is displayed. For example, when the selected channel is a weather report channel, an introduction of "A real-time weather information channel provided by the Meteorological Administration. Updated in 10 minute periods," is displayed. Also, in the lowermost area of the Popup My Channel screen 1200, a text of "This is Popup My Channel," is displayed together with the menu screen.

When the user selects a desired channel from the channel list screen, the channel images and image map information of the corresponding channel are received and displayed on the screen, and when desired, the set screen may be set as the background screen.

Referring to the channel list, from the point of the weather report channel 1210, pressing the left key displays the bell sound channel 1210 and the Text Message Land channel 1220, and pressing the right key displays the stock channel 1230 and the mail channel 1240, while various contents other than the channels illustrated in FIG. 13, such as news, show business information, traffic information, home shopping information, advertisement information, etc., may be displayed.

The weather report channel 1210 provides the day's weather and is updated in 10 minute intervals, where the updating period may be adjusted. Also, the weather report channel 1210 implements an automation system to periodically generate channel images in the channel server, is divided into weekly weather, monthly weather, and regional weather, provides them in a fee-charging KUN page, and induces the user to purchase the company's contents or subscribe to a service.

Figure 14:
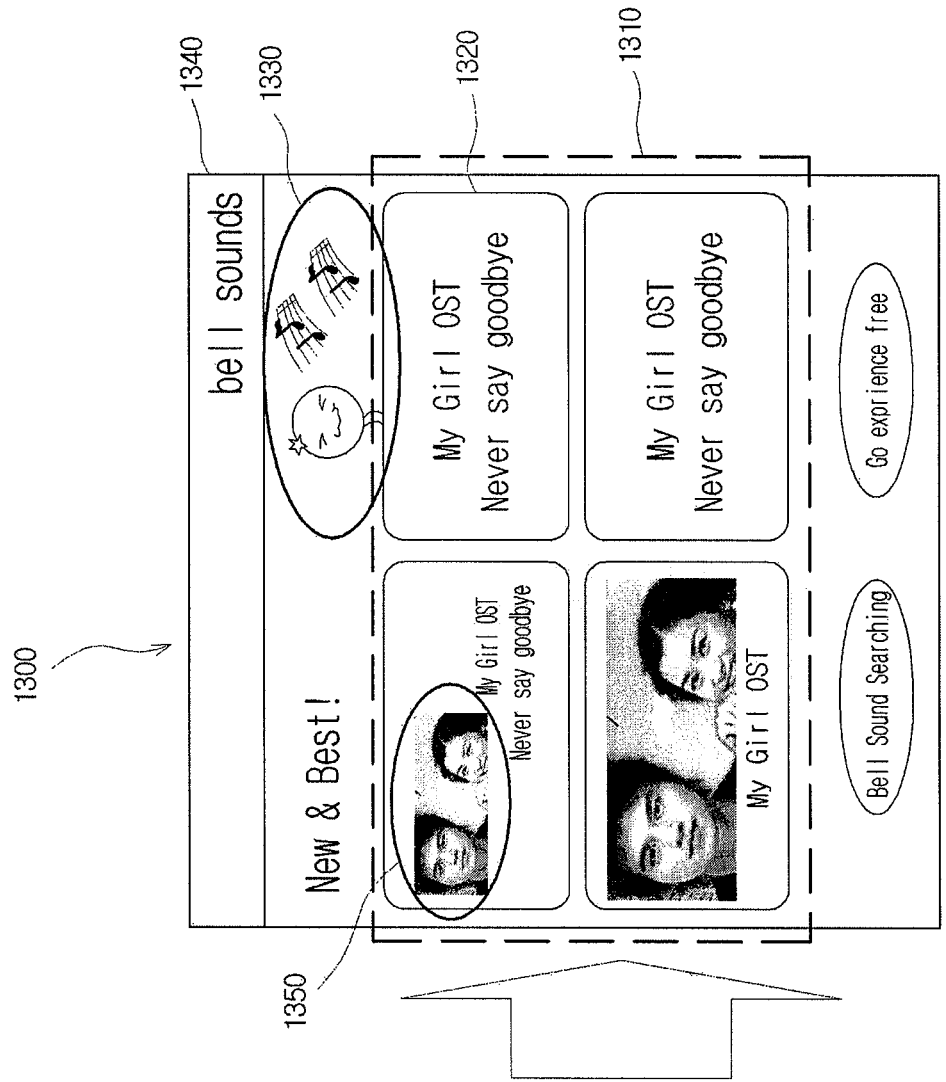
FIG. 14 and FIG. 15 are block diagrams illustrating examples of popup my channel applications illustrated in FIG. 13.

Referring to the appended FIG. 14, the bell sound channel 1220 provides current materials and hit materials from Sound Land, sets the update period to once every day, implements an automation system to periodically generate channel images in the channel server, and induces the user to purchase a bell sound. Also, the bell sound channel 1220 provides a special event link that allows the user to try a free trial, although this is not provided every time but is provided at random.

Figure 15:
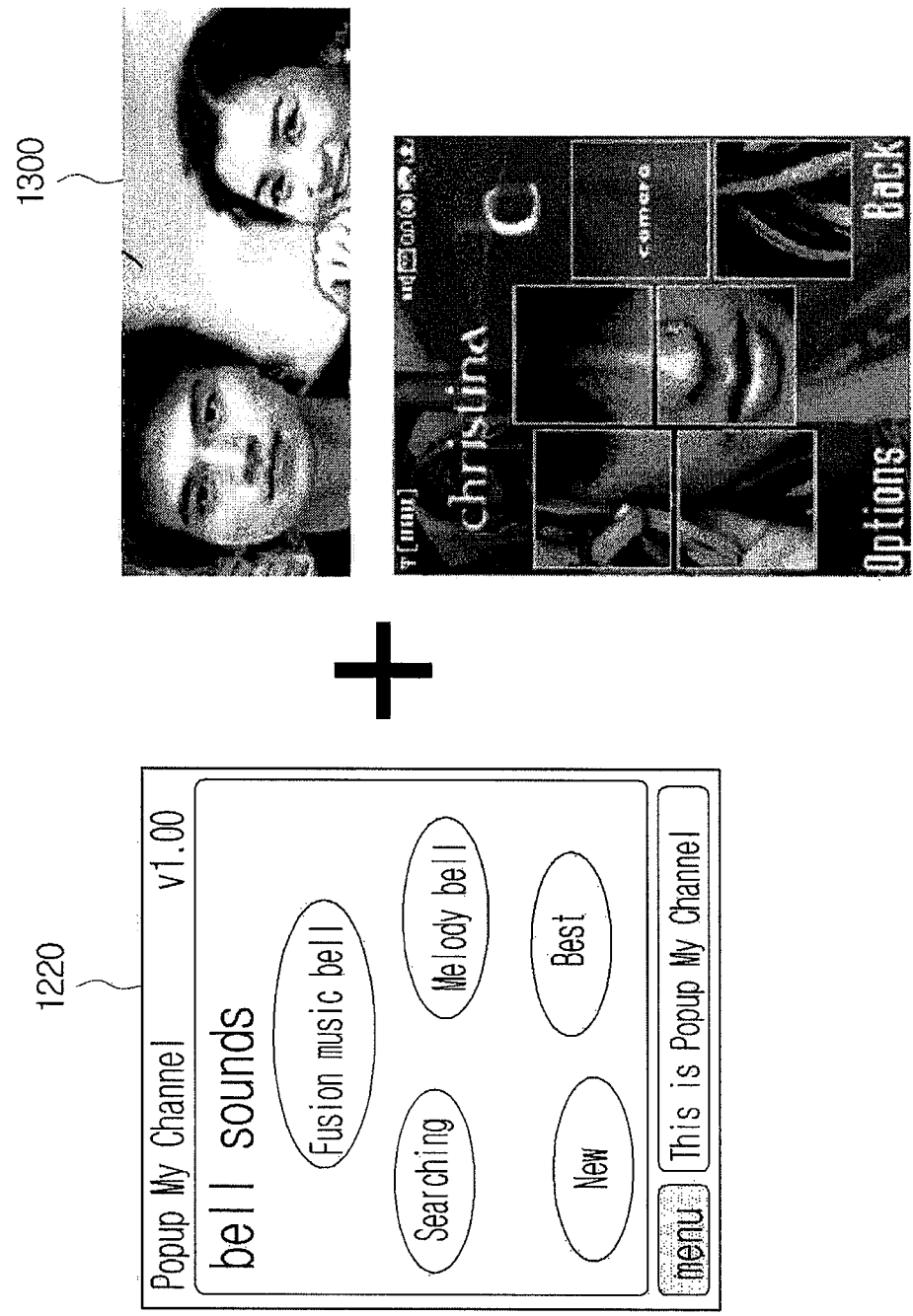

When "New" "Best" are selected in the bell sound channel 1220 screen, a screen 1300 is displayed that will decorate the background screen. The screen to decorate the background screen has area 1310 divided into four background screen lists, while area 1320 is the screen on which to display the content names and on which text will be expressed as images, with the fonts, etc., expressed freely without limit. Also, area 1330 is decorated with images related to the service concept to have as little empty space as possible, while the uppermost area 1340 of area 1300 displays the service banner and has a representative description phrase inserted, and area 1350 has images related to the contents inserted. Finally, in the lowermost area of the screen 1300, "Bell Sound Searching" and "Go experience free," etc., are displayed. Such a screen 1300 having images related to the contents may be combined with the bell sound channel 1200, as illustrated in the appended FIG. 15, to provide a background screen in step with current trends.

The stock channel 1230 updates stock information in 10 minute intervals, and implements an automation system to periodically generate channel images in the channel server. Also, the stock channel 1230 provides real-time information in a fee-charging KUN page, periodically changes the types of screens provided, and provides the information of items of interest set by the user by wire.

The mail channel 1240 provides mail box for the user, and implements an automation system to generate channel images in the mail channel server in real time when there is a request. Also, the mail channel 1240 provides real-time, detailed mail checking and mail viewing in a fee-charging KUN page or a monthly-fee application, and induces the user to purchase the company's contents or subscribe to a service. For using such a mail channel, an authentication of the user is performed in a wired site.

A method of providing a dynamic content-based background screen service based on a background screen service provider system comprised as above will be described in more detail with reference to the appended drawings.

FIG. 16 is a flow diagram illustrating service procedures for providing a content-based background screen service according to an embodiment of the invention.

Referring to FIG. 16, in the terminal 1100 in operation 1410, after selecting the desired channel through the channel list in the Popup My Channel screen 1200 displayed on the display part, information on the selected channel is requested through the service gateway 1120 to the content packaging server 1130, i.e. a background screen setting is reported. Such background screen channel information is automatically requested periodically or when the popup is activated.

Then, in operation 1420, the service gateway 1120 requests the image files and image map file of the selected channel from the UPI registered beforehand in the content packaging server 1130. Accordingly, in operation 1430, the channel web server 1140 receives the detailed information of the channel from the information server 1150 of the corresponding channel to generate the images and image map file.

Afterwards in operation 1440, the channel web server 1140 transmits the current images and image map file that have been generated to the content packaging server 1130. Then, in operation 1450, the content packaging server 1130 transmits the generated images and image map file to the service gateway 1120. Accordingly, in operation 1460, the service gateway 1120 processes the authentication of the received images and image map file, and afterwards converts them to a form that can be transmitted to the terminal 1100 and packages them to an inside standard.

Next, in operation 1470, the service gateway 1120 transmits the packaged images and image map to the terminal 1100. Accordingly, in operation 1480, the terminal 1100 displays the received images and image map on the screen of the display part. Afterwards, when the user pulls, i.e. removes, the corresponding channel from the background screen using a particular key, the terminal 1100 stops the channel content update and runs a background screen deactivation.

After thus displaying the images and image map, when the user presses an up/down/left/right button, a focus area is displayed on the screen based on the image map information provided. Afterwards, when the user presses the OK button, an external application or external KILN/ME page connected to the corresponding area is operated. Accordingly, the user may access the detailed information and contents easily and immediately. Here, the charge for the images and image map information regarding the channel is free by default, and the content packaging server 1130 is able to increase sales by facilitating the exposure of and access to profit-generating contents through the channels provided.

Thus, by applying such an embodiment of the invention, one application may be set to occupy the background screen, and various contents may be used after they are downloaded from the content packaging server in a channel type. When the user selects the desired content from these various contents (channels), the corresponding contents are directly set on the background screen, where the background screen deactivation may be executed directly using a particular key. Therefore, the user may set and deactivate the desired content on the background screen, as easily as for changing TV channels.

In addition, an aspect of the invention makes it possible to freely change/upgrade, etc., and is a content based system, such that only the contents are provided from the perspective of the content packaging server, whereby there is no need for applications that require a lot of resources, and OEM based services can be provided to the terminal, so that not only manufacturers and mobile communication companies but also other businesses can provide the services.

The method according to an aspect of the invention as set forth above may be implemented in the form of a program to be stored in a recorded medium (CD ROM, RAM, ROM, floppy disk, hard disk, optical magnetic disk, etc) readable by a computer. As such procedures may readily be practiced by a person of ordinary skill in the field of art to which aspects of the invention belong, they will not be described in further detail.

The terms or words used in the present specification and claims are not to be interpreted in a manner limited to their ordinary or dictionary meanings, but will be interpreted to be the meanings and concepts that are in accordance with the spirit of the invention, based on the principle that the inventor may appropriately define the concepts of terms in order to describe the invention in the best way possible.

According to at least one embodiment of the invention, several contents provided in a mobile communication system environment can be provided at once on a mobile communication terminal idle screen in an idle mode, to satisfy the demands of the user for DIY services and increase the content participation rate.

In addition, the several contents provided on the idle screen of the mobile communication terminal are each processed independently, so that it is easy to change the contents provided and the user may freely arrange the contents on the idle screen.

In addition, by providing content-based services in which several contents (channels) are downloaded with one application, it is possible to freely change/upgrade, etc., the background screen, and since only the contents are provided from the perspective of the content packaging server, the desired background screen may be implemented easily without a need for applications that require a lot of resources, and the user may access the detailed information and contents easily and immediately.

While the above description has pointed out novel features of the invention as applied to various embodiments, the skilled person will understand that various omissions, substitutions, and changes in the form and details of the device or process illustrated may be made without departing from the scope of the invention. Embodiments of the invention can also be applied to non-video data. Therefore, the scope of the invention is defined by the appended claims rather than by the foregoing description. All variations coming within the meaning and range of equivalency of the claims are embraced within their scope.

What is claimed:

1. A mobile communication terminal comprising:
   a memory configured to store computer-executable instructions for processing a plurality of data units to generate result information, the instructions causes a computing system to:
   receive, in a channel type, via a background screen application executed on the mobile communication terminal, a plurality of contents from a plurality of content providing servers through a mobile communication system;
   operate the mobile communication terminal and run the background screen application, which when executed, causes the mobile communication terminal to allocate each of the plurality of contents received from a respective content providing server from among the plurality of content providing servers into a respective individual layer, select contents which are to be provided to an idle screen of the mobile communication terminal from among the received contents, objectify the selected contents to form a plurality of objects, and synthesize at least two of the plurality of objects into an idle screen layer;
   in response to the mobile communication terminal being in an idle mode, provide the idle screen layer to the idle screen of the mobile communication terminal in response;
   wherein a size and a position of a selected object of the plurality of objects is changed by interactions with a user, the interactions including:
   altering from the idle mode to a first mode based on a first user input,
   in response to the first user input, displaying a menu containing representations of the plurality of objects,
   in response to a second user input, cycling through the representations of the plurality of objects presented via the menu in order to select an object for configuration,
   presenting a menu for selection of options for changing the size and for changing the position of the selected object, receiving a third user input indicating a selection of an option for changing the size or for changing the position of the selected object, wherein, when the third user input selects the option for change the position of the selected object, changing the position of the selected object based on a fourth user input while displaying a preview which shows the selected object in a changed position;

wherein, when the third user input selects the option for change the size of the selected object, changing the size of the selected object based on a fifth user input while displaying a preview which shows the selected object in a changed size; and returning from the first mode to the idle mode based on a sixth user input, in the returned idle mode the selected object in the changed size or position being displayed.

2. The mobile communication terminal of claim 1, further comprising a communication part which accesses a base station to perform a communication.

3. The mobile communication terminal of claim 2, wherein the communication part achieves the communication with the base station through a pilot channel, a paging channel and a traffic channel.

4. The mobile communication terminal of claim 1, further comprising a control part which processes receiving and placing operations of phone call signals.

5. The mobile communication terminal of claim 1, further comprising a vibration device which transfers information through a vibration of a vibration motor.

6. The mobile communication terminal of claim 1, wherein the instructions further cause the computing system to change a size of at least one of the plurality of objects on the idle screen.

7. The mobile communication terminal of claim 6, wherein a size of an object of the plurality of objects is configurable among three predetermined sizes.

8. The mobile communication terminal of claim 1, wherein each of the plurality of objects is operated independently of the other objects of the plurality of objects.

9. The mobile communication terminal of claim 1, wherein the instructions further cause the computing system to:
in response to receiving the plurality of content, separate first content from among the plurality of contents received from a first content providing server from among the plurality of content providing servers to a first layer from among a plurality of individual layers and separate second content from among the plurality of contents received from a second content providing server from among the plurality of content providing servers different and remote from the first content providing server to a second layer from among the plurality of individual layers, and
setting a first identification information to the first layer and second identification information, different than the first identification information, to the second layer.

10. The mobile communication terminal of claim 1, wherein each of the plurality of contents that has been synthesized reside in a heap in the memory, and
wherein the plurality of contents are provided via a push method.

11. A method of processing a plurality of contents received from a plurality of content providing services through a mobile communication system, the method comprising:
receiving, by a mobile communication terminal, in a channel type, via a background screen application executed at the mobile communication terminal, a plurality of contents directly from the plurality of content providing servers via a channel type application;
allotting the received contents into a plurality of individual layers such that first content from among the received contents is allotted to a first individual layer from among the plurality of individual layers and second content from among the received contents is allotted to a second individual layer from among the plurality of individual layers;
selecting contents which are to be provided to an idle screen of the mobile communication terminal from among the received contents;
objectify the selected contents to form a plurality of objects;
synthesizing at least two of the plurality of objects into an idle screen layer; and
in response to the mobile communication terminal being in an idle mode, providing the synthesized idle screen layer to an idle screen of the mobile communication terminal,
wherein a size and a position of a selected object of the plurality of objects is changed by interactions with a user, the interactions including:
altering from the idle mode to a first mode based on a first user input,
in response to the first user input, displaying a menu containing representations of the plurality of objects,
in response to a second user input, cycling through the representations of the plurality of objects presented via the menu in order to select an object for configuration,
presenting a menu for selection of options for changing the size and for changing the position of the selected object,
receiving a third user input indicating a selection of an option for changing the size or for changing the position of the selected object,
wherein, when the third user input selects the option for changing the position of the selected object, changing the position of the selected object based on a fourth user input while displaying a preview which shows the selected object in a changed position;
wherein, when the third user input selects the option for change the size of the selected object, changing the size of the selected object based on a fifth user input while displaying a preview which shows the selected object in a changed size; and
returning from the first mode to the idle mode based on a sixth user input, in the returned idle mode the selected object in the changed size or position being displayed.

12. The method of claim 11, wherein a content of the plurality of contents is allotted to a corresponding object of the plurality of objects, and the corresponding object secures at least a partial area of the idle screen.

13. The method of claim 11 further comprising selecting an object to be synthesized to the idle screen from among the plurality of objects according to the input from the user.

14. The method of claim 11, wherein the plurality of contents include at least one of a stock information content, a weather information content, and a search window content.

15. The method of claim 11, wherein each of the plurality of objects is operated independently of the other objects of the plurality of objects.

16. The method of claim 11, the plurality of contents are transferred from the at least one content providing server to the mobile communication terminal via the mobile communication system and a base station.

17. The method of claim 11, wherein the size of the object is configurable among three predetermined sizes.

18. The method of claim 11, further comprising updating the plurality of objects to reflect the allotted contents.

19. A mobile communication terminal comprising:
a memory configured to store computer-executable instructions; and
a processor configured to execute the stored instructions, which when executed by the processor are configured to:
receive, in a channel type, via a background screen application executed on the mobile terminal, a plurality of contents from a plurality of content providing servers through a mobile communication system, the plurality of contents being allotted into a plurality of objects,
operate the mobile communication terminal and run an application comprising a user interface,
allocate each of the plurality of contents received from a respective content providing server from among the plurality of content providing servers into a respective individual layer,
select contents which are to be provided to an idle screen of the mobile communication terminal from among the received contents,
objectify the selected contents to form a plurality of objects, and
synthesize at least two of the plurality of objects into an idle screen layer and provide the idle screen layer to an idle screen of the mobile communication terminal in response to the mobile communication terminal being in an idle mode,
wherein a size and a position of a selected object of the plurality of objects is changed by interactions with a user, the interactions including:
altering from the idle mode to a first mode based on a first user input,
in response to the first user input, displaying a menu containing representations of the plurality of objects,
in response to a second user input, cycling through the representations of the plurality of objects presented via the menu in order to select an object for configuration,
presenting a menu for selection of options for changing the size and for changing the position of the selected object,
receiving a third user input indicating a selection of an option for changing the size or for changing the position of the selected object,
wherein, when the third user input selects the option for change the position of the selected object, changing the position of the selected object based on a fourth user input while displaying a preview which shows the selected object in a changed position;
wherein, when the third user input selects the option for changing the size of the selected object, changing the size of the selected object based on a fifth user input while displaying a preview which shows the selected object in a changed size; and
returning from the first mode to the idle mode based on a sixth user input, in the returned idle mode the selected object in the changed size or position being displayed.

* * * * *